(12) United States Patent
Rau et al.

(10) Patent No.: US 11,270,356 B2
(45) Date of Patent: Mar. 8, 2022

(54) METHODS AND APPARATUS FOR EFFICIENT EXECUTION OF MODULES

(71) Applicant: The Nielsen Company (US), LLC, New York, NY (US)

(72) Inventors: Nicholas Naveen Rau, Larkspur, CA (US); Ryan O'Hearn, Oakland, CA (US); Thomas Sturm, Sausalito, CA (US); Jeremy Bennett, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/074,595

(22) Filed: Oct. 19, 2020

(65) Prior Publication Data

US 2021/0035168 A1 Feb. 4, 2021

Related U.S. Application Data

(63) Continuation of application No. 13/763,333, filed on Feb. 8, 2013, now Pat. No. 10,810,634.

(51) Int. Cl.
*G06Q 30/02* (2012.01)
(52) U.S. Cl.
CPC .................. *G06Q 30/0277* (2013.01)
(58) Field of Classification Search
CPC .................................................. G06Q 30/0277
See application file for complete search history.

(56) References Cited

U.S. PATENT DOCUMENTS

| 6,247,050 | B1 | 6/2001 | Tso et al. |
| 6,353,929 | B1 | 3/2002 | Houston |
| 7,111,280 | B2 | 9/2006 | Levien et al. |
| 7,356,143 | B2 | 4/2008 | Morten |

(Continued)

FOREIGN PATENT DOCUMENTS

| CN | 101035018 A | 9/2007 |
| CN | 102047286 A | 5/2011 |

(Continued)

OTHER PUBLICATIONS

China National Intellectual Property Administration, "First Notification of Office Action," dated Mar. 26, 2021 in connection with Chinese Patent Application No. 201811229871.5, 14 pages (including translation).

(Continued)

*Primary Examiner* — Breffni Baggot
(74) *Attorney, Agent, or Firm* — Hanley, Flight & Zimmerman, LLC

(57) ABSTRACT

Methods and apparatus for efficient execution of modules are disclosed. An example method includes generating, by a first module, a first module identifier, the first module having been instantiated by an advertisement on a webpage, loading, by the first module, a component, communicating the module identifier to the component, determining that a second module having a second module identifier has been loaded, and, in response to determining that the second module has been loaded, communicating, by the first module, the second module identifier to the component to instruct the component to communicate with the second module.

20 Claims, 10 Drawing Sheets

(56) References Cited

U.S. PATENT DOCUMENTS

| | | | |
|---|---|---|---|
| 8,001,232 B1* | 8/2011 | Saulpaugh | G06Q 30/06 709/224 |
| 8,407,319 B1 | 3/2013 | Chiu et al. | |
| 8,505,106 B1* | 8/2013 | Bhosle | H04L 9/3213 726/28 |
| 8,626,865 B1* | 1/2014 | Phillips | G06F 16/9574 709/213 |
| 8,881,016 B2 | 11/2014 | Barnes et al. | |
| 9,009,298 B2 | 4/2015 | Besehanic et al. | |
| 9,037,963 B1* | 5/2015 | Chandi | G06Q 30/0253 715/234 |
| 10,810,634 B2 | 10/2020 | Rau et al. | |
| 2007/0101291 A1* | 5/2007 | Forstall | G06F 3/0482 715/805 |
| 2007/0101340 A1* | 5/2007 | Yoo | H04M 1/72403 718/107 |
| 2008/0222613 A1* | 9/2008 | Allen | G06F 16/335 717/128 |
| 2009/0094339 A1* | 4/2009 | Allen | H04L 67/34 709/206 |
| 2009/0117942 A1* | 5/2009 | Boningue | H04M 1/7243 455/564 |
| 2009/0299862 A1 | 12/2009 | Fan et al. | |
| 2010/0037317 A1 | 2/2010 | Oh | |
| 2010/0100605 A1* | 4/2010 | Allen | H04L 67/125 709/217 |
| 2010/0100626 A1* | 4/2010 | Allen | H04L 67/1095 709/227 |
| 2010/0281107 A1 | 11/2010 | Fallows et al. | |
| 2011/0029393 A1* | 2/2011 | Apprendi | G06F 11/3419 705/14.73 |
| 2011/0126177 A1 | 5/2011 | Charters et al. | |
| 2011/0161990 A1 | 6/2011 | Smith et al. | |
| 2011/0167486 A1 | 7/2011 | Ayloo et al. | |
| 2012/0016749 A1 | 1/2012 | Lisbakken | |
| 2012/0042261 A1* | 2/2012 | Phillips | G06F 9/451 715/744 |
| 2012/0150958 A1 | 6/2012 | Beshanic et al. | |
| 2012/0167057 A1 | 6/2012 | Schmich et al. | |
| 2012/0227060 A1* | 9/2012 | Allen | G06F 9/5027 719/320 |
| 2013/0227587 A1 | 8/2013 | Deng et al. | |

FOREIGN PATENT DOCUMENTS

| | | |
|---|---|---|
| CN | 102469035 | 5/2012 |
| CN | 102566889 A | 7/2012 |
| CN | 102737336 A | 10/2012 |
| CN | 102741872 | 10/2012 |
| JP | 2000029802 | 1/2000 |
| JP | 2012032983 | 2/2012 |
| JP | 2012521609 | 9/2012 |
| JP | 2013012813 | 1/2013 |

OTHER PUBLICATIONS

European Patent Office, "Communication Pursuant to Rules 161 and 162 EPC," issued in connection with application No. 14748932.2 dated Sep. 15, 2015, 2 pages.
Canadian Intellectual Property Office, "Office Action," issued in connection with application No. 2,875,366, dated Dec. 7, 2015, 4 pages.
IP Australia , "Patent Examination Report No. 2," issued in connection with Application No. 2014215583, dated Dec. 24, 2015, 3 pages.
Patent Cooperation Treaty, "International Preliminary Report on Patentability", issued in connection with application No. PCT/US2014/014474, dated Aug. 11, 2015, 10 pages.
IP Australia, "Patent Examination Report No. 1", issued in connection with Australian Patent Application No. 2014215583, dated Aug. 20, 2015, 3 pages.
IP Australia, "Examination Report," dated Nov. 21, 2019 in connection with Australian Patent Application No. 2018253597, 4 pages.
European Patent Office, "Summons to Attend Oral Proceedings," dated Feb. 4, 2020 in connection with European Patent Application No. 14748932.2, 15 pages.
IP Australia, "Examination Report No. 3," dated Aug. 14, 2018 in connection with Australian Patent Application No. 2016256754, 4 pages.
Canadian Intellectual Property Office, "Notice of Allowance," dated Jul. 4, 2018 in connection with Canadian Patent Application No. 2,875,366, 1 page.
European Patent Office, "Communication Pursuant to Article 94(3) EPC," dated Jun. 29, 2018 in connection with European Patent Application No. 14748932.2, 11 pages.
State Intellectual Property Office of China, "Notice of Completion of Formalities for Patent Registration," dated Aug. 7, 2018 in connection with Chinese Patent Application No. 201480001407.4, 5 pages (including translation).
IP Australia, "Notice of Acceptance," mailed Aug. 2, 2016 in connection with Australian Patent Application No. 2014215583, 2 pages.
IP Australia, "Examination Report No. 2," dated Mar. 28, 2018 in connection with Australian Patent Application No. 2016256754, 4 pages.
IP Australia, "Examination Report No. 4," dated Oct. 17, 2018 in connection with Australian Patent Application No. 2016256754, 4 pages.
State Intellectual Property Office of China, "3rd Notification of Office Action," dated Oct. 19, 2017 in connection with Chinese Patent Application No. 201480001407.4, 22 pages (including translation).
IP Australia, "Notice of Allowance," dated Jun. 10, 2020 in connection with Australian Patent Application No. 2018253597, 3 pages.
Japanese Patent Office, "Notice of Reasons for Rejection," issued in connection with Japanese Application No. P2015-525650, dated Mar. 22, 2016, 4 pages.
Japanese Patent Office, "Notice of Reasons for Rejection," issued in connection with Japanese Application No. P2015-525650, dated Jul. 19, 2016, 4 pages.
European Patent Office, "Extended Search Report," issued in connection with European Patent Application No. 14748932.2, dated Jun. 21, 2016, 11 pages.
Wikipedia, "Random number generation," Jan. 28, 2013, retrieved on May 31, 2016, [https://en.wikipedia.org/w/index.php?title=Randomnumbergeneration&oldid=535331117], 7 pages.
Wikipedia, "Pseudorandom number generator," Jan. 22, 2013, retrieved on May 31, 2016, [https://en.wikipedia.org/w/index.php?title=Pseudorandomnumbergenerator&oldid=534293484], 7 pages.
Wikipedia, "Web Messaging," Jan. 26, 2013, retrieved on May 31, 2016, [https://en.wikipedia.org/w/index.php?title=WebMessaging&oldid=535021299], 3 pages.
IP Australia, "Examination Report," issued in connection with Australian Patent Application No. 2016256745, dated Oct. 26, 2017, 3 pages.
State Intellectual Property Office of the People's Republic of China, Translation of "Second Notification of Office Action," issued in connection with Chinese Patent Application No. 20148001407,4, dated Apr. 28, 2017, 21 pages, including translation.
State Intellectual Property Office of China, "First Office Action," issued in connection with Chinese Patent Application No. 201480001407.4, dated Aug. 19, 2016, 11 pages (English translation provided).
European Patent Office, "Communication pursuant to Article 94(3) EPC," issued in connection with European Patent Application No. 14748932,2, dated Aug. 11, 2017, 8 pages.
Walsh, "HTML5's window.postMessage API," Nov. 3, 2010, retrieved from the Internet Jan. 14, 2016, 13 pages.
Canadian Intellectual Property Office, "Office Action," issued in connection with Canadian Patent Application No. 2,875,366, dated Sep. 5, 2017, 5 pages.

(56) References Cited

OTHER PUBLICATIONS

International Searching Authority, "International Search Report and Written Opinion of the International Searching Authority," issued in connection with application No. PCT/US2014/014474, dated May 30, 2014, 15 pages.
Kantor, Ilya, "Cross-window messaging with postMessage," JavaScript Tutorial, Oct. 7, 2011, accessed on Sep. 24, 2014 at [https://web.archive.org/web/20111007225957/http:/javascript.info/tutorial/cross-window-messaging-with-postmessage], 4 pages.
West, Matt, "Cross-Domain Messaging With postMessage," Treehouse Blog, Sep. 12, 2013, accessed on Sep. 24, 2014 at [http://blog.teamtreehouse.com/cross-domain-messaging-with-postmessage], 12 pages.
Pitale, Tony, "Using Javascript postMessage to Talk to iFrames," Jul. 5, 2011, accessed on Sep. 24, 2014 at [http://viget.com/extend/using-javascript-postmessage-to-talk-to-iframes], 4 pages.
Stackoverflow, "Preload script without execute," Jun. 20, 2012, accessed on Sep. 24, 2014 at [https://web.archive.org/web/20120620102132/http:/stackoverflow.com/questions/11102625/preload-script-without-execute], 3 pages.
IP Australia, "Notice of Grant," issued in connection with Australian Patent Application No. 2014215583, dated Nov. 24, 2016, 1 page.
IP Australia, "Examination report No. 2," issued in connection with application No. 2016256745 dated Mar. 28, 2018, 4 pages.
The State Intellectual Property Office of China, "4th Office Action," issued in connection with application No. 201480001407.4, dated Apr. 27, 2018, 18 pages, including translation.
Japanese Patent Office, "Notice of Allowance," issued in connection with Japanese Patent Application No. 2015-525650, dated Nov. 1, 2016, 3 pages.
Canadian Intellectual Property Office, "Office Action," issued in connection with Canadian Patent Application No. 2,875,366, dated Nov. 2, 2016, 4 pages.
IP Australia, "Notice of Acceptance," issued Jun. 10, 2020 in connection with Australian Patent Application No. 2018253597, 3 pages.
European Patent Office, "Decision to Refuse," mailed Sep. 18, 2020 in connection with European Patent Application No. 14748932.2, 22 pages.
United States Patent and Trademark Office, "Non-Final Office Action," dated Jul. 29, 2015 in connection with U.S. Appl. No. 13/763,333, 9 pages.
United States Patent and Trademark Office, "Final Office Action," dated Mar. 18, 2016 in connection with U.S. Appl. No. 13/763,333, 19 pages.
United States Patent and Trademark Office, "Non-Final Office Action," dated Jul. 13, 2017 in connection with U.S. Appl. No. 13/763,333, 28 pages.
United States Patent and Trademark Office, "Final Office Action," dated Mar. 29, 2018 in connection with U.S. Appl. No. 13/763,333, 33 pages.
United States Patent and Trademark Office, "Examiner's Answer to Appeal Brief," issued Jan. 11, 2019 in connection with U.S. Appl. No. 13/763,333, 6 pages.
United States Patent and Trademark Office, "Decision on Appeal," issued Jun. 2, 2020 in connection with U.S. Appl. No. 13/763,333, 8 pages.
United States Patent and Trademark Office, "Notice of Allowance," dated Jun. 17, 2020 in connection with U.S. Appl. No. 13/763,333, 7 pages.
IP Australian, "Examination report No. 1 for standard patent application," dated Sep. 23, 2021 in connection with Australian Patent Application No. 2020239814, 3 pages.

\* cited by examiner

METHODS AND APPARATUS FOR EFFICIENT EXECUTION OF MODULES

This patent arises from a continuation of U.S. patent application Ser. No. 13/763,333, entitled "Methods and Apparatus for Efficient Execution of Modules," filed on Feb. 8, 2013. U.S. patent application Ser. No. 13/763,333 is incorporated herein in its entirety. Priority to U.S. patent application Ser. No. 13/763,333 is hereby claimed.

FIELD OF THE DISCLOSURE

This disclosure relates generally to module execution, and, more particularly, to methods and apparatus for efficient execution of modules.

BACKGROUND

In recent years, the use and, likewise, the complexity of network delivered media (e.g., Internet delivered media such as webpages) has increased. Such media often includes multiple dynamic elements that are performed (e.g., executed) during the loading and presentation of the media. For example, media (e.g., an advertisement on a webpage) may be instrumented with a module (e.g., JavaScript code) that is executed by a user computer to cause a survey to be presented in association with presentation of the advertisement.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Media may be associated with multiple modules that perform actions in association with the media (e.g., a webpage or a portion thereof). For example, a first module may track presentation of the media, a second module may present a survey, etc. In another example, media (e.g., a webpage) may be presented with advertisements that each include one or more modules. Additionally, modules may be associated with components (e.g., a toolbox of common functions utilized by the modules). Accordingly, execution of multiple modules may overlap (e.g., multiple modules may be executed substantially simultaneously) and may attempt to create multiple instances of a single component. Some methods and apparatus disclosed herein facilitate communication amongst modules that coexist. Additionally or alternatively, some methods and apparatus disclosed herein facilitate coordination of the execution of modules to prevent creation of multiple instances of a single component utilized by multiple modules. Media may include content and/or advertisements. Content and/or advertisements are collectively referred to herein as material.

Figure 1:
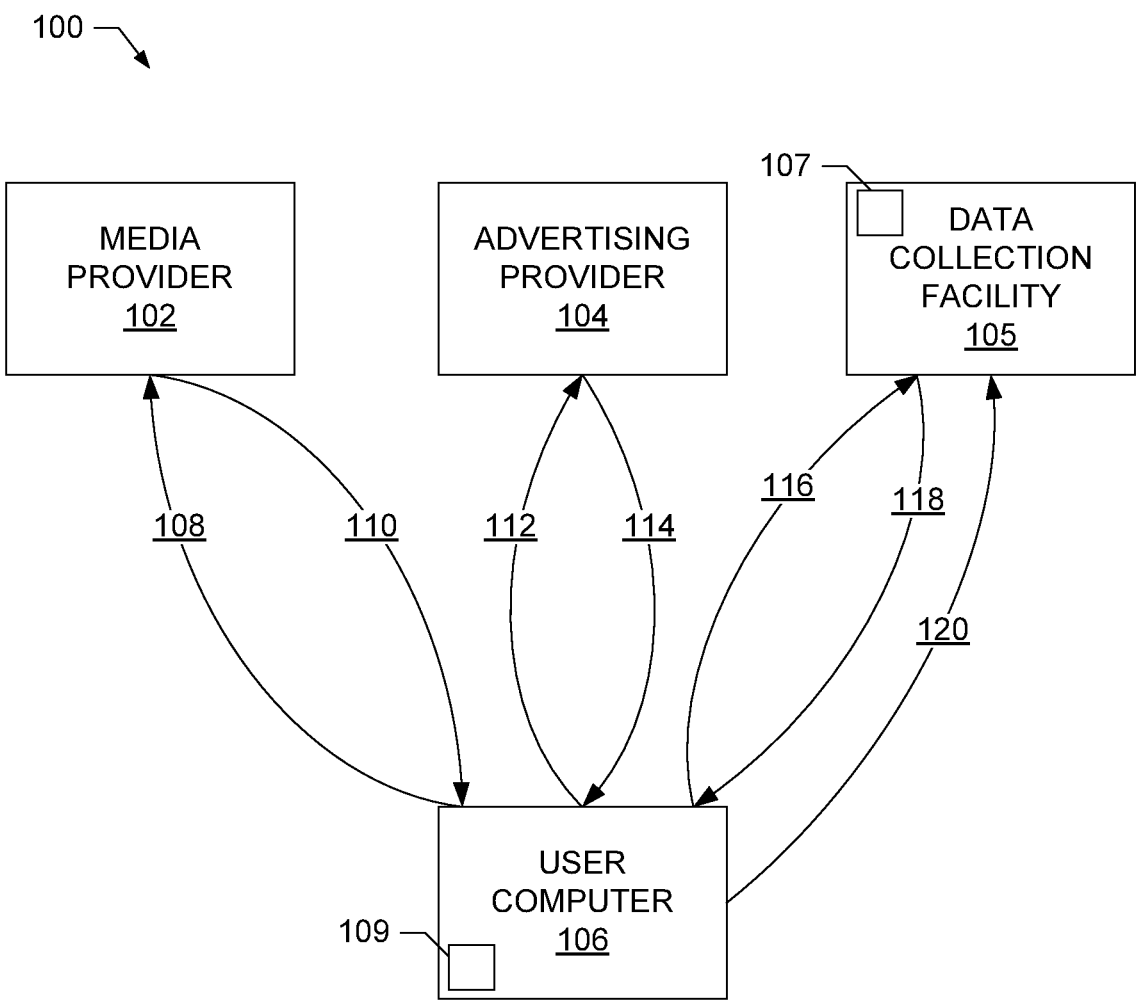
FIG. 1 is a block diagram of an example system constructed in accordance with the teachings of this disclosure for presenting and tracking media.

FIG. 1 is a block diagram of an example system 100 for presenting and tracking media. The example system 100 includes a media provider 102, an advertising provider 104, a data collection facility 105, and a user computer 106. The system 100 of the illustrated example is an internet-based system in which the user computer 106 is communicatively coupled by one or more networks to the media provider 102, the advertising provider 104, and the data collection facility 105. The one or more networks (or other networks) may also communicatively couple any of the media provider 102, the advertising provider 104 and the data collection facility 105. The system 100 may alternatively not be an internet-based system and may be implemented in any other environment.

The media provider 102 of the illustrated example is an internet media provider that includes one or more servers that serve webpages to the user computer 106. The webpages may include media, advertisements, or any other embedded or otherwise associated material. According to the illustrated example, the advertisements are provided to the user computer 106 by the advertising provider 104. Alternatively, the advertisements may be provided by any other source including the media provider. The media provider 102 may, alternatively, be any other type of media provider such as, for example, a file server, an audio and/or video provider, a database server, etc.

The example advertising provider 104 of FIG. 1 serves advertisements that are embedded in or otherwise associated with the webpages served by the media provider 102. For example, the advertisements may be provided to the advertising provider 104 by entities wishing to have their products advertised on the webpages served by the media provider 102. To meter (e.g., monitor, verify, track, etc.) the presentation of advertisements, the advertising provider 104 operates in cooperation with the data collection facility 105. In particular, the advertising provider 104 of FIG. 1 instruments the advertisements with one or more modules 107 that perform metering (e.g., links, embeds, or otherwise associates the advertisements with the modules). According to the illustrated example, the advertisements include instructions that cause the user computer to obtain the module 107 from the data collection facility 105. The module 107 may perform any type of metering such as, for example, presenting a survey at the user computer 106, sending information about the presentation of an advertisement to the data collection facility 105, sending information about the user computer 106 and/or a user of the user computer 106 to the data collection facility, etc. The example advertising provider 104 may, alternatively, serve the modules to the user computer 106.

The data collection facility 105 of the illustrated example serves modules (e.g., the module 107) to the user computer 106 and receives data sent by the modules. Additionally or alternatively, the data collection facility 105 may receive data sent by modules sent to the user computer 106 from other sources (e.g., the advertising provider 104). The data collection facility 105 of the illustrated example utilizes the received data to generate reports. For example, the data collection facility 105 may generate a report indicating the number of presentations (e.g., hits, visits, views, impressions, etc.) of advertisements served by the advertising provider 104. The reports generated by the data collection facility 105 may be published, provided to the advertising provider 104, provided to advertisers working with the advertising provider 104, etc.

The user computer 106 of the illustrated example, is a personal computer executing a web browser 109 that requests, receives, and presents material from the media provider 102, the advertising provider 104, etc. Alternatively, the user computer 106 may be any type of computing device such as, for example, a portable computing device, a desktop computer, a laptop computer, a mobile telephone, a network connected television, a set top box, a Blu-ray player, and so forth.

While the illustrated example of FIG. 1 includes one of each of the media provider 102, the advertising provider 104, the data collection facility 105, and the user computer 106, any number of any or all of these components may be included in a system. For example, multiple user computers 106 may access media from multiple media providers 102. Multiple advertising providers 104 may provide advertisements for presentation with content from multiple content providers 102. Modules associated with the media and/or advertising may transmit data to a single data collection facility 105, to multiple data collection facilities 105 associated with a single entity, and/or to multiple data collection facilities 105 associated with multiple entities.

The block diagram of FIG. 1 also includes an example message flow illustrated by messages 108-120. The example message flow begins when the user computer 106 sends a request (e.g., a hyper-text transport protocol (HTTP) GET request) to the media provider 102 (message 108). In response to the message 108, the media provider 102 transmits media (e.g., a webpage) to the user computer 106 (message 110). The media includes instructions (e.g., a reference to load material in an IFRAME) that cause the user computer 106 to send another request to the advertising provider 104 (message 112). For example, the user computer 106 may request one or more advertising banners from the advertising provider 104. In response to the message 112, the advertising provider 104 sends the requested advertisement (e.g., the advertising banner(s)) to the user computer 106 (message 114). In some examples, the advertising material is instrumented with instructions that cause the user computer 106 to request one or more modules (e.g., module 107) (e.g., a JavaScript for displaying a survey) from the data collection facility 105 (message 116). In response, the data collection facility 105 transmits the requested module(s) 107 to the user computer 106 (message 118). The user computer 106 executes the module(s) 107 which, for example, transmit data (e.g., survey results) back to the data collection facility (message 120).

Message flows other than those of FIG. 1 may be utilized in methods and apparatus disclosed herein. For example, the module may be included in the material provided in message 110 and/or message 114 such that messages 116 and 118 are not sent. Alternatively, message 116 may request modules from a location other than the data collection facility 105. Alternatively, any combination of the foregoing messages may be utilized.

While FIG. 1 illustrates a single message flow, many message flows may occur (e.g., substantially simultaneously) with a user computer 106 and/or other user devices. For example, as described in further detail herein, media provided by the media provider 102 may include and/or reference multiple advertisements. Each advertisement may be associated with a module (e.g., different modules or multiple instances of the same module). When those modules are associated with the same entity (e.g., a media metering entity), it may be desirable for the modules to communicate and/or coordinate operation. While examples disclosed herein refer to advertisements instrumented with one or more modules, any material (e.g., media, content, etc.) may be instrumented with one or more modules. For example, content may be instrumented with one or more modules to meter presentation of the content.

Figure 2:
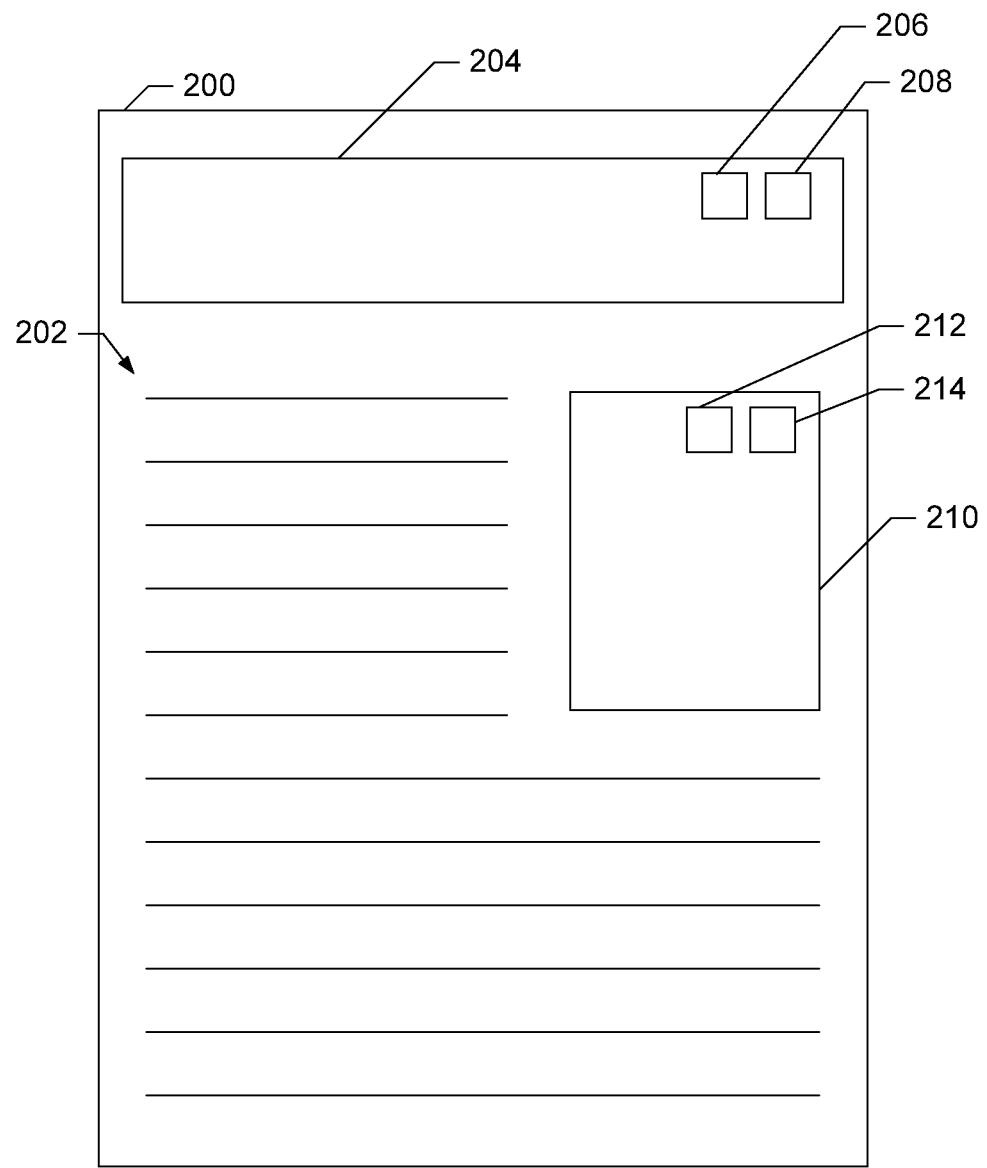
FIG. 2 is an illustration of example webpage material that includes media instrumented with modules.

FIG. 2 is an illustration of an example webpage 200 that includes advertisements 204 and 210 instrumented with multiple modules (e.g., 206, 208, 212, 214). The example webpage of FIG. 2 includes a primary media 202 (e.g., text, images, video, etc.).

In the illustrated example, each of the advertisements 204, 210 includes two modules 206, 208 and 212, 214. A first module 206, 212 in each example pair of modules 206, 208 and 212, 214 generates and displays surveys related to the respective advertisements 204, 210 with which they are associated. The second example module 212, 214 in each example pair of modules 206, 208 and 212, 214 is a toolbox of functions that may be utilized by the example modules 206, 212. For clarity, modules utilized by other modules (e.g., the modules 212, 214) are referred to herein as components. Components may be modules, libraries, databases, datastores, or any other element that may be utilized by a module. For example, a component may be a mobile device toolbox that includes functions used to meter a mobile device, a personal computer toolbox that includes functions used to meter a personal computer, etc.

In some instances, it may be useful for the modules 206, 210 to communicate with each other. For example, the module 206 may gather demographic information from a user and communicate that information to the module 212 so that the module 212 does not need to request the same information. In another example, the module 206 may implement a data transceiver for communicating with the data collection facility 105 of FIG. 1 and the module 212 may communicate gathered data to the module 206 for relaying to the data collection facility 105. Additionally or alternatively, it may be advantageous for modules to communicate to facilitate sharing of resources. For example, the module 206 may load an instance of a toolbox as module (component) 208 and may communicate with the module 212 so that the module 212 utilizes the module 208 and does not need to load module 214. Such an apparatus may be a more efficient use of hardware resources as it reduces the need to load and/or execute multiple modules.

Figure 3:
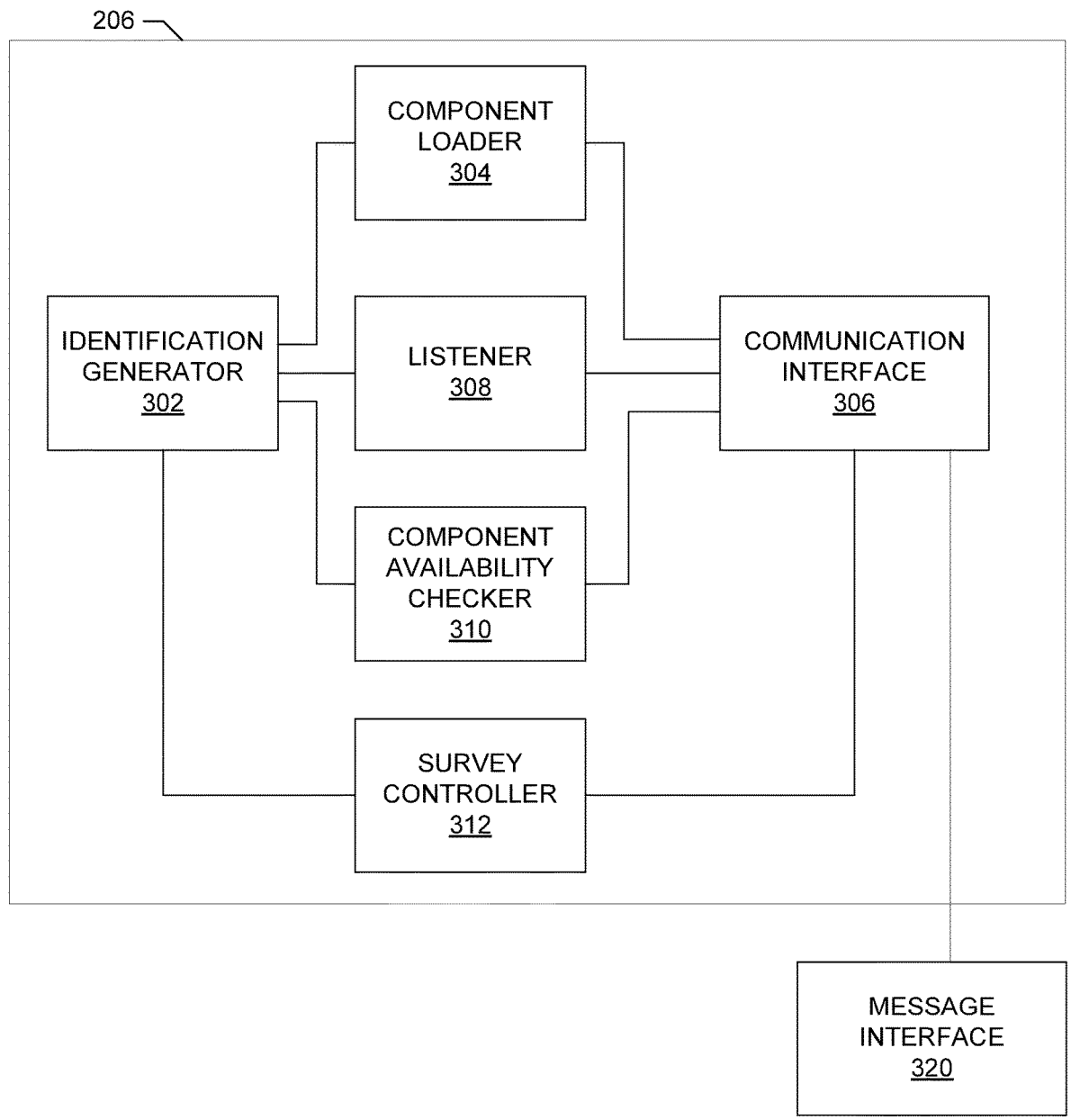
FIG. 3 is a block diagram of an example module that may be used to implement one or more of the modules of FIG. 2.

An example implementation of the module 206 is shown in FIG. 3. To, for example, facilitate communication, resource sharing, and other coordination between modules, the example module 206 illustrated by the block diagram of FIG. 3 includes an identification generator 302, a component loader 304, a communication interface 306, a listener 308, and a component availability checker 310. The module 206 is communicatively coupled with a message interface 320.

The identification generator 302 of the illustrated example, generates a unique or semi-unique module identifier to be associated with an instance of the module 206. The example identification generator 302 generates a 10 digit random or pseudorandom number as the module identifier. In particular, the example identification generator 302 causes a random or pseudorandom number generator to execute multiple times to increase the randomness of the number (e.g., to avoid two different modules executing substantially simultaneously from being assigned the same random number). An example algorithm for generating a random number is illustrated in Table 1. The example algorithm reduces the likelihood that two modules may generate the same random number (particularly in instances where multiple modules might be substantially simultaneously generating random numbers). Any other algorithm for generating a random number and/or a module identifier may alternatively be utilized.

TABLE 1

Example JavaScript Random Number Generation Algorithm

```
// randomize the script id thoroughly by
multiplying/dividing the timestamp with two
random numbers
id = new Date( ).getTime( );
// id starts with a JS timestamp as seed
var all_nines = '9999999999';
// filler string if the Math comes up short of 10
digits
do { r1 = Math.floor(Math.random( ) * 500); }
while (r1 < 1 || 100 < r1);
// loop until the JS random( ) method for 1...500
comes back within 1...99
do { r2 = Math.floor(Math.random( ) * 500); }
while (r2 < 101 || 200 < r2);
// loop until the JS random( ) method for 1...500
comes back within 101...199
// the loops are not instant, so this forces greater
randomness on r2 (random( ) is using a page life
timestamp seed)
id = Math.floor((id * r1) / r2);
// this typically results in 10-12 digits
id = id.toString( ).substring(0,10);
// may be less than 10 chars after the type
change if the trailing digits are zeros
if (id.length < 10) {
    id = id + all_nines.substring(0,10-
id.length);
// add 9s at the end to guarantee 10 chars
}
```

The component loader 304 of the illustrated example loads components (e.g., module 208) to be utilized by the module 206. For example, the component loader 304 may instruct a user computer 106 to load an instance of a specific component into memory so that the module 206 can access functions provided by the component. The component loader 304 communicates the module identifier generated by the identification generator 302 to the component. For example, the component loader 304 may pass the module identifier to the component when loading the component and/or may communicate the module identifier to the component via the communication interface 306. As described in further detail below, in the illustrated example, the module 206 sends messages to the component utilizing the message interface 320 on which multiple modules may send and receive messages. Accordingly, the module identifier enables the component to recognize messages sent to the component by the module 206. For example, the component may ignore messages sent by other modules (e.g., for security, simplicity, etc.).

The example communication interface 306 of FIG. 3 communicatively couples the module 206 with a message interface 320. According to the illustrated example, the module 206 communicates with other modules/components using the postMessage application programming interface of HTML5. Alternatively, the communication interface 306 may communicatively couple the module 206 with any other message interface 320.

The listener 308 in the illustrated example monitors the message interface 320 (e.g., the postMessage interface) via the communication interface 306 to receive messages from other modules. For example, the listener 308 may detect that another module (e.g., module 212 of FIG. 2) has been loaded and may communicate with the other module. For example, the listener 308 may send a message to the other module in response to detecting that the other module has been loaded. The message may inform the other module of the component(s) that have been loaded by the module 206. In response, another module may request access to one or more of the component(s). The listener 308 may receive a module identifier from the other module and may transmit that identifier to the requested component to cause the component to watch the message interface 320 for messages from the other module and, thus, to be responsive to such messages. Additionally or alternatively, the listener 308 may send a message via the communication interface 306 on the message interface 320 including the module identifier of the module 206 instructing the other module to utilize the module identifier of the module 206 when communicating with the requested module. The listener 308 may monitor the message interface 320 for any other messages such as, for example, messages communicating data to the module 206, messages requesting data from the module 206, and so forth.

The component availability checker 310 of the illustrated example monitors a message interface 320 (e.g., the postMessage interface) via the communication interface 306 to determine if another module (e.g., module 212) has already loaded a component that the module 206 will access. If another module (e.g., module 212) has already loaded the component (e.g., module 214), the component availability checker 310 communicates with the other module (e.g., module 212) to coordinate access to the component (e.g., module 214). For example, the component availability checker 310 may send the module identifier from the identification generator 302 to the other module (e.g., module 212), which other module instructs the component (e.g., module 214) to watch for messages that include the module identifier. Additionally or alternatively, the component availability checker 310 may request the module identifier of the other module (e.g., module 212) and may instruct the communication interface 306 and/or the survey controller 312 to utilize the module identifier of the other module (e.g., module 212) when communicating with the component loaded by the other module. After coordinating access to the component of another module, the component availability checker 310 of the illustrated example stops or prevents the component loader 304 from loading the same component. Accordingly, processing cycles, message usage, etc. are reduced by the modules coordinating access to a single instance of a component, thereby increasing the efficiency of and reducing the load upon the underlying processor, memory, and/or other hardware resources (e.g., the hardware resources of the user computer 106, the hardware resources of the data collection facility 105, etc.).

The survey controller 312 of the illustrated example generates surveys to be presented with media to which the module 206 is associated. For example, an advertisement may be instrumented with the module 206 by embedding or otherwise attaching the module to the ad. The survey controller 312 may communicate with other modules/components by sending messages including the module identifier of its module generated by the identification generator 302 to the message interface 320 (e.g., the postMessage interface) via the communication interface 306. The survey controller 312 may receive messages sent by other modules/components from the listener 308, which receives the messages from the message interface 320 (e.g., the postMessage interface) via the communication interface 306.

In the example of FIG. 3, the survey presentation functionality of the module 206 is controlled by the survey controller 312. Alternatively, the survey functionality could be controlled by any other logic, controller, or function to perform the operations of the module. For example, the module 206 could be an audio/video player, a presentation monitor, a dynamic media loader, or any other type of module. In other words, while particular examples are provided for illustration, the disclosed methods and apparatus for module communication may be utilized with any types of hardware and/or software modules.

The example message interface 320 provides an interface through which multiple modules may communicate. For example, the message interface 320 may be the postMessage application programming interface of HTML5 or any other similar interface. The message interface 320 may allow modules to communicate across domains (e.g., modules from different source domains), may allow modules to communicate across webpages simultaneously loaded at a user computer, may allow modules to communicate across webpages that are not simultaneously loaded (e.g., when the message interface 320 survives after a webpage is closed), may restrict communication to modules loaded from a single base webpage (e.g., modules loaded by the webpage and modules loaded by advertisements loaded by the webpage), etc. The message interface 320 is described in further detail in conjunction with FIGS. 7-10.

While an example manner of implementing the module 206 of FIG. 2 is illustrated in FIG. 3, one or more of the elements, processes and/or devices illustrated in FIG. 3 may be combined, divided, re-arranged, omitted, eliminated and/or implemented in any other way. Further, the example identification generator 302, the example component loader 304, the example communication interface 306, the example listener 308, the example component availability checker 310, the example survey controller 312 and/or, more generally, the example module 206 of FIG. 2 may be implemented by hardware, software, firmware and/or any combination of hardware, software and/or firmware. Thus, for example, any of the example identification generator 302, the example component loader 304, the example communication interface 306, the example listener 308, the example component availability checker 310, the example survey controller 312 and/or, more generally, the example module 206 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example identification generator 302, the example component loader 304, the example communication interface 306, the example listener 308, the example component availability checker 310, the example survey controller 312 and/or, more generally, the example module 206 are hereby expressly defined to include a tangible computer readable storage device or storage disc such as a memory, DVD, CD, Blu-ray, etc. storing the software and/or firmware. Further still, the example module 206 of FIG. 2 may include one or more elements, processes and/or devices in addition to, or instead of, those illustrated in FIG. 3, and/or may include more than one of any or all of the illustrated elements, processes and devices.

Figure 4:
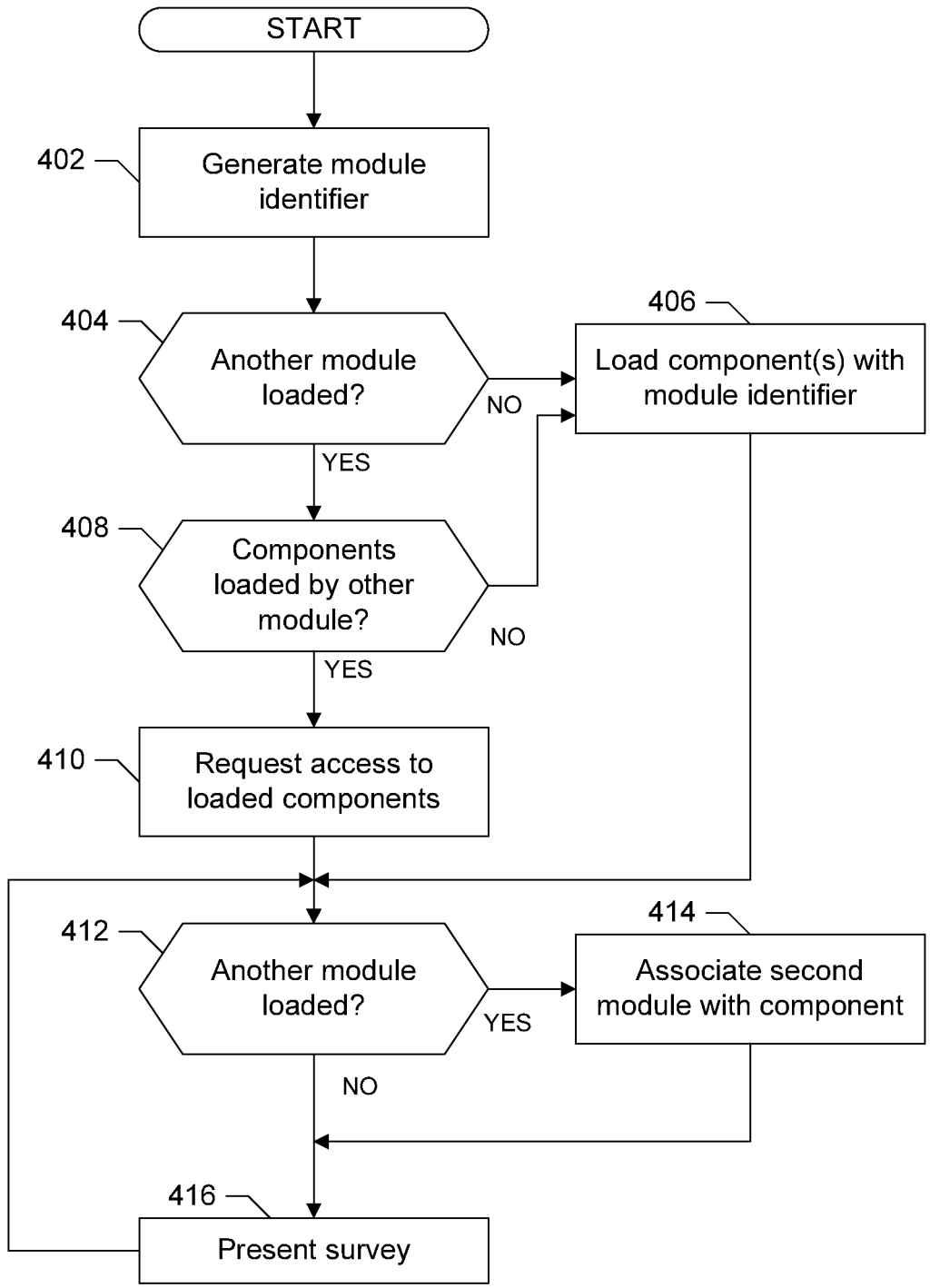
FIG. 4 is a flowchart representative of example machine readable instructions that may be executed to implement the module of FIG. 3.

A flowchart representative of example machine readable instructions for implementing the module 206 of FIGS. 2 and/or 3 is shown in FIG. 4. In this example, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 4, many other methods of implementing the example module 206 of FIGS. 2 and/or 3 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The program of FIG. 4 begins when the identification generator 302 generates a module identifier for the module 206 (block 402). The identification generator 302 may also announce the module identifier to other modules by transmitting a message to a message interface 320 via the communication interface 306. Accordingly, other modules can be made aware of the loading and presence of the module 206.

The component availability checker 310 then determines if any other modules are loaded (block 404). For example, the component availability checker 310 may check the message interface 320 via the communication interface 306 to determine if other modules have announced their presence. When no other modules are detected, the component loader 304 loads the components utilized by the module 206 (block 406). For example, the component loader 304 may load one or more components that the module 206 will use during its operation. Control then proceeds to block 412.

When one or more other modules are detected by the component availability checker 310 (block 404), the component availability checker 310 determines if one or more components utilized by the module 206 have already been loaded by the one or more other modules (block 408). When the one or more components utilized by the module 206 have not been loaded by the one or more other modules, the component loader 304 loads the components utilized by the module 206 (block 406). Control then proceeds to block 412.

When the one or more components utilized by the module 206 have been loaded by the one or more other modules (block 408), the component availability checker 310 requests access to the one or more components (block 410). For example, the component availability checker 310 may send a message to the one or more other modules via the communication interface 306. The message may include the module identifier of the module 206 and/or an identification of the component to be accessed. The one or more other modules may provide access for the module 206 to the one or more components as described below in conjunction with block 414. While the example of FIG. 4 indicates the module 206 either utilizes previously loaded components or loads the components, the module 206 may alternatively utilize some previously loaded components and may additionally load some components that were not previously loaded by other modules. In other words, block 408 may be performed for each component to be utilized by the module 206 and block 410 may be performed for each previously loaded component and block 406 may be performed to load each module that is not previously loaded. For example, blocks 406, 408, and 410 may be located in a loop to re-execute once for each component that the module 206 would like to load.

After requesting access to components (block 410) and/or loading components (block 406), the listener 308 determines if another module has been loaded (block 412). For example, the listener 308 monitors a message interface 320 to detect messages from other modules announcing that they have loaded. Additionally or alternatively, the listener 308 may detect that other modules are requesting access to a component already loaded by the component loader 304.

When another (second) module is detected (block 412), the listener 308 associates the second module with one or more components loaded by the component loader 304 (block 414). As described in conjunction with FIG. 5, the listener 308 may associate the second module with the one or more components by sending a module identifier of the second module to the one or more components loaded by the module 206. For example, the one or more components loaded by the module 206 may not listen to messages identified with the module identifier of the second module until the module 206 sends the module identifier of the second module to the one or more components with instructions that the components should listen to messages from the second module. Additionally or alternatively, as described in conjunction with FIG. 6, the listener 308 may associate the second module with the one or more components by instructing the second module to use the module identifier associated with the module 206 when communicating with the one or more components. After associating the second module with the one or more components, control proceeds to block 416.

When no other modules have been loaded (block 412) and/or after associating a second module with one or more components (block 414), the survey controller 312 presents a survey (block 416). For example, the survey may presented immediately after blocks 412 and 414, may be presented in parallel with blocks 412 and 414, may be presented after an amount of time has passed and no other modules are detected, etc. While the example module 206 presents a survey, any other operations or functions may additionally or alternatively be performed by the module 206. In other words, the program associated with blocks 402-414 could be performed with any type of module. For example, in addition to or alternative to presenting a survey, the module 206 may transmit received data to a collection facility (e.g., data received from other modules, data received from a component, etc.), the module 206 may perform other audience measurement operations (e.g., metering content presentation, metering advertisement presentation, metering audio and/or video presentation, etc.), and so forth.

The example program of FIG. 4 continually checks for other modules to be loaded (block 412) while performing the operations of the module (block 416). While the flowchart of FIG. 4 illustrates that blocks 412 and 416 are performed in series, the blocks may be performed in parallel or substantially in parallel. Accordingly, the module 206 may perform its particular operations while monitoring for other modules and providing the other modules with access to components loaded by the module 206.

Figure 5:
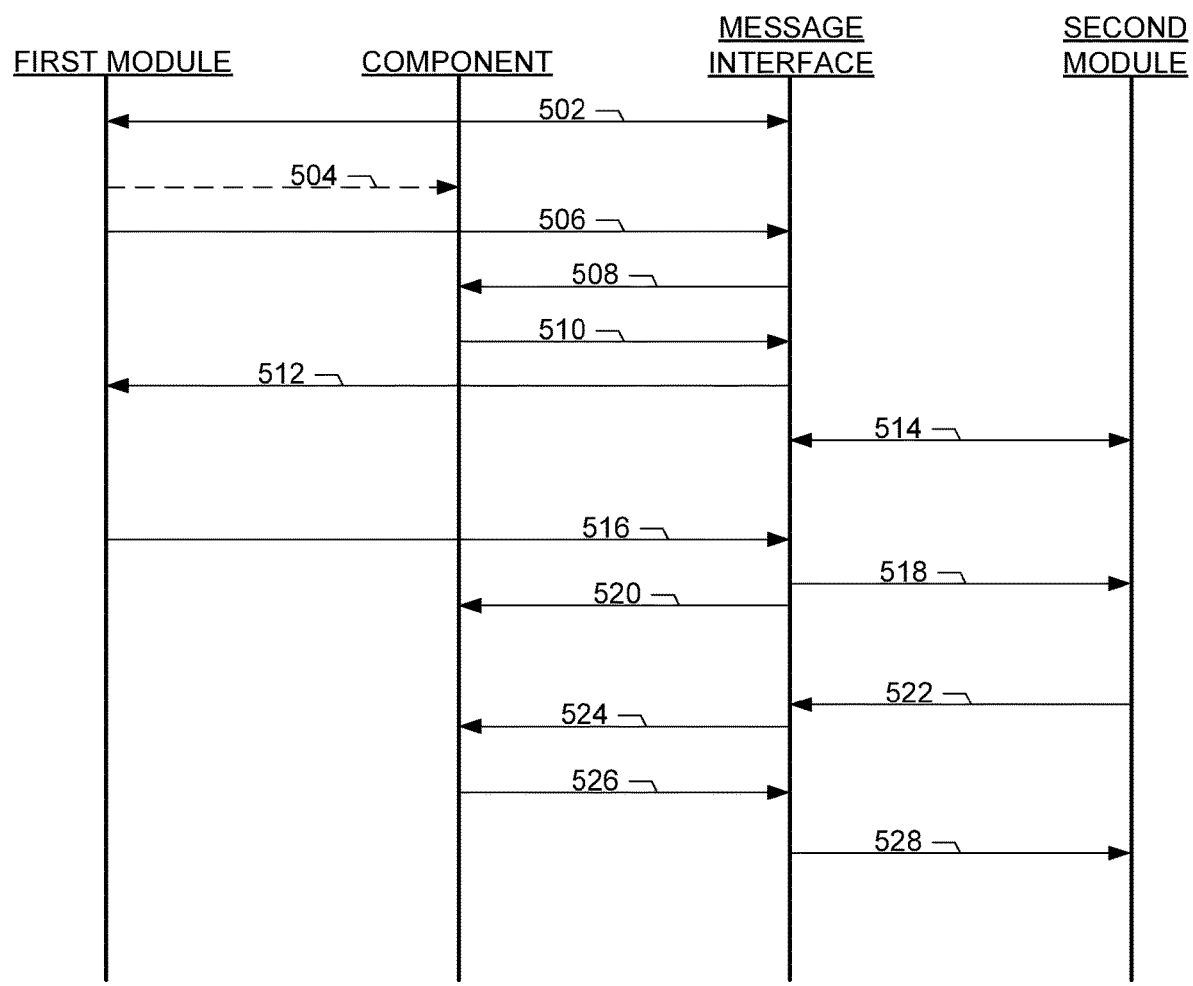
FIGS. 5 and 6 are message diagrams representative of example messages that may be transmitted according to example methods and apparatus disclosed herein.
Figure 6:
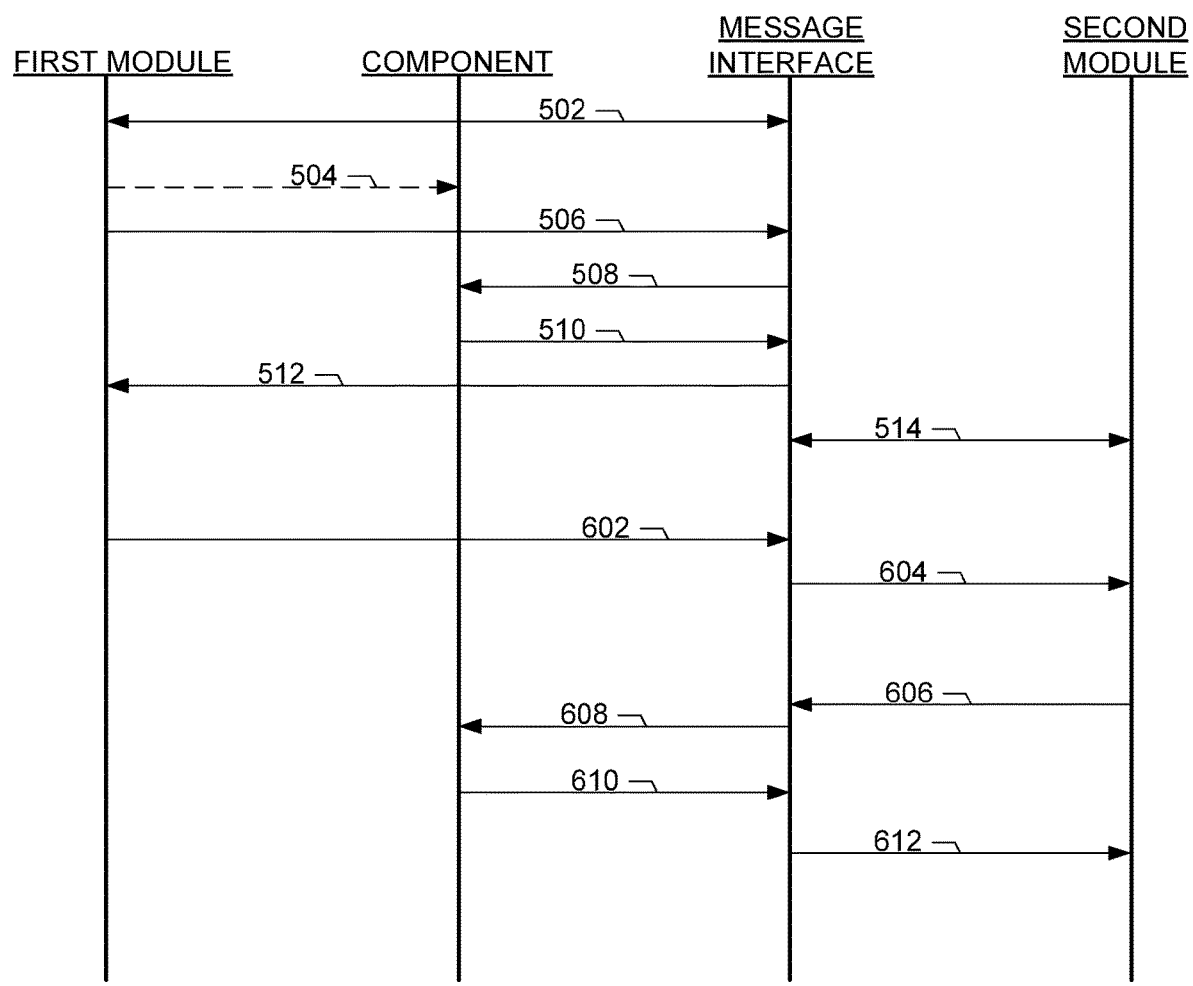

FIGS. 5 and 6 are example message diagrams illustrating two different manners in which the listener 308 of the module 206 may associate a second module with a component loaded by the module 206. Generally, FIG. 5 illustrates that the listener 308 of FIG. 3 notifies the component of a module identifier of the second module and FIG. 6 illustrates that the listener 308 notifies the second module of the module identifier of the module 206 for use in communicating with the component.

The messages 502 to 514 appear in both FIGS. 5 and 6 but are described once to reduce redundancy. These messages illustrate an example communication scenario and other communication scenarios are possible.

The example messages of FIGS. 5 and 6 are formatted as a module identifier followed by a delimiter (e.g., a "|"), followed by a message type (e.g., a one-word descriptor the message purpose, function, etc.), and a message payload (e.g., a list of values delimited by, for example, semicolons). An example message is: "8912589713|DATA|BROWER=MOZILLA; TS=201302080724; DOMAIN=SAMPLE.COM; PAGE=NEWS.HTML." The messages are posted to a message interface 320 (e.g., the postMessage interface) that is available to the module 206 and other modules. Alternatively, any other message format may be utilized.

The message diagrams of FIGS. 5 and 6 begin when a first module (e.g., module 206) is loaded and announces itself to the message interface 320 by sending message 502. For example, the identifier generator 302 may generate a module identifier and transmit an announcement message 502 with the module identifier to the message interface 320. The first module (e.g., the component availability checker 310) may determine that no other modules have been loaded by reviewing any other messages at the message interface (e.g., if no other modules have announced that they have loaded the first module may determine that no other modules are currently loaded). According to the illustrated example, the first module determines that no other modules are loaded and, thus, no components have been loaded. Thus, the first module loads 504 the component.

Subsequently, the first module (e.g., the survey controller 312) then transmits a message 506 to the message interface 302 including the module identifier of the first module. For example, the message may be a request for some information from the component (e.g., a network address of a computer associated with the execution of the first module). The component is monitoring the message interface (e.g., by registering to be alerted of new messages, but periodically requesting messages from the message interface 320, etc.) and, thus, retrieves 508 the message 506 from the message interface 320. The component transmits a message 510 including the requested information to the message interface 320. For example, the message from the component may include a unique or semi-unique identifier (e.g., a module identifier) for the component. The first module (e.g., the listener 308) is monitoring the message interface 320 and, thus, detects the posting of message 510 and retrieves 512 the message 510 from the message interface 320. While a single roundtrip communication between the first module and the component is illustrated, many other communications may occur.

At some time after the first module is loaded or substantially simultaneous with loading of the first module, a second module (e.g., module 212 of FIG. 2) is loaded and transmits (e.g., by its respective identification generator 302) a message 514 announcing its presence to the message interface. The second module (e.g., via its respective component availability checker 310) may, at the same time, determine that other modules have been loaded by retrieving and examining other messages at the message interface. According to the illustrated example, the second module discovers that the first module is loaded. Thus, the second module does not load one or more components that have already been loaded by the first module. For example, the first module may have posted a message to the message interface indicating the components that have been loaded by the first module, the second module may know the components utilized by the first module, the second module may send a message to the first module requesting a list of components loaded by the first module, etc.

According to the example of FIG. 5, after the second module has announced its presence, the first module (e.g., the listener 308) detects the announcement message 514 from the second module posted on the message interface. In response, the first module (e.g., the listener 308) sends message 516 to the message interface indicating that the component should begin listening for messages from the second module. Alternatively, the listener 308 may wait for a request from the second module to access the component. The example message 516 is identified with the module identifier of the first module and includes in its payload a module identifier associated with the second module (e.g., the module identifier of the second module may be retrieved by the listener 308 of the first module from the message 514). The second module (e.g., via its respective component availability checker 310), which is monitoring the message interface, retrieves 518 the message 516 and determines that the component has been notified of its presence and, thus, the second module may begin communicating with the component utilizing the module identifier of the second module. Prior to, after, or at approximately the same time as message 518, the component receives 520 the message 516 from the first module and records that the component should now listen for messages labeled with the module identifier of the second module.

Accordingly, the second module (e.g., the survey controller 312 of the second module or another component of the second module) sends a request message 522 for the component to the message interface. The request message 522 includes the module identifier of the second module. The component detects the message 522 because it is now listening for messages including the module identifier of the second module and retrieves 524 the request message 522. The component generates a response to the request message 522 and transmits a response message 526 to the message interface. The second module (e.g., the listener 308) retrieves 528 the response to the message.

FIG. 6 illustrates the first module sharing its module identifier with the second module to enable the second module to access the component rather than notifying the component of the second module as illustrated in FIG. 5. According to the example of FIG. 6, after the second module has announced its presence in message 514, the first module (e.g., the listener 308) detects the announcement message 514 from the second module. In response, the first module (e.g., the listener 308) sends message 602 to the message interface indicating that the second module should utilize the module identifier of the first module to communicate with the component. For example, the message 602 may include the instruction to use the module identifier of the first module along with information about the availability of the component, information about the capabilities of the component, and/or any other information that may be utilized by the second module. The second module (e.g., the component availability checker 310), which is monitoring the message interface, retrieves 604 the message 602 and notifies any relevant components (e.g., the component loader 304 and/or the survey controller 312) that the component has already been loaded and can be accessed using the module identifier received from the first module.

Accordingly, the second module (e.g., the survey controller 312 of the second module or another component of the second module) sends a request message 606 for the component to the message interface. The request message 606 includes the module identifier of the first module. The component detects the message 606 because it is listening for messages including the module identifier of the first module and retrieves 608 the request message 606. The component generates a response to the request message 606 and transmits a response message 610 to the message interface. The second module (e.g., the listener 308) retrieves 612 the response to the message.

Accordingly, in both FIG. 5 and FIG. 6, the second module is able to communicate with the component without the second component loading a second instance of the component. Accordingly, utilization of the processing and memory resources needed to load a second instance of the component is avoided.

Figure 7:
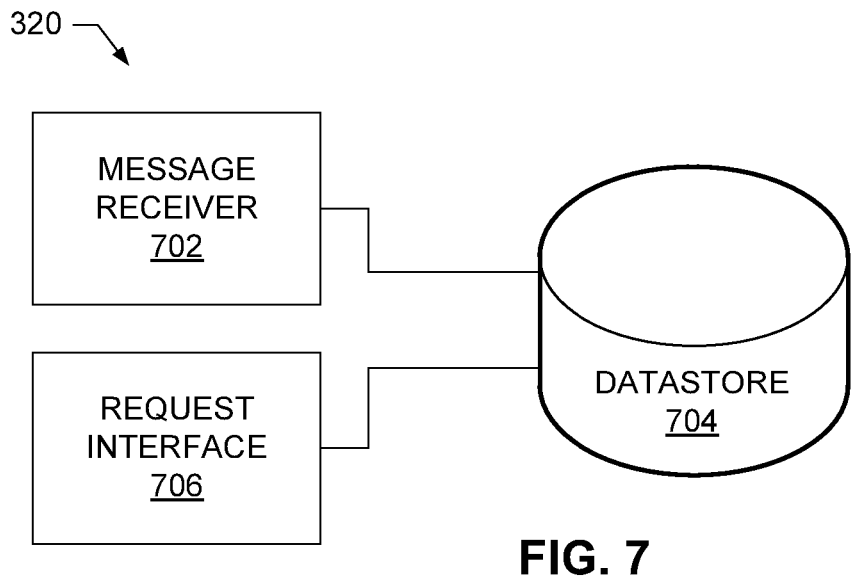
FIG. 7 is a block diagram of an example message interface that may be used to implement the message interface of FIG. 3.

FIG. 7 is a block diagram of an example implementation of the message interface 320 of FIG. 3. The example message interface 320 includes a message receiver 702, a datastore 704, and a request interface 706. The example message interface 320 receives messages from modules/ components and makes those messages available to other modules/components. Accordingly, the message interface 320 facilitates inter-communication between modules/components. For example, while most web browser security restrictions prevent cross-domain interaction between modules/components, the message interface may provide a repository to which a message can be posted by a first module associated with a first domain and retrieved by a second module associated with a second domain.

The example message interface 320 allows communication amongst modules associated with a single web page instance. For example, a first web page may include modules associated with content, modules associated with one or more advertisements, etc. and the message interface 320 may allow the modules associated with the webpage to communicate while preventing modules associated with other webpages (e.g., web pages loaded in other windows) from communicating with the modules from the first webpage. In other words, an instance of the message interface 320 may be instantiated for each web page instance. Alternatively, any other configuration may be utilized. For example, the message interface 320 may allow communication among modules from all web pages executing on a user computer, may allow communication among all modules of web pages in a particular web browser at the user computer, among all modules from a single source (e.g., a single data collection facility, multiple data collection facilities associated with a single entity (e.g., associated by a domain name), and so forth.

The message receiver 702 of the example message interface 320 of FIG. 7 receives messages from modules/components and stores the messages in the datastore 704. The message receiver 702 may transform the messages (e.g., by adding a timestamp; by grouping the messages by message type, message source, etc.; and so forth). The message receiver 702 may additionally alert the request interface 706 of the receipt of messages (e.g., when the request receiver 706 is set to send notices to modules/components that have registered for notification of events).

The datastore 704 of the illustrated example is a location in memory (e.g., memory of the user computer 106). Additionally or alternatively, any other type of storage may implement the datastore 704. The datastore 704 may operate like a message board in which messages are posted and stored in the order that they are received. Alternatively, messages may be grouped, categorized, bundled, etc. The messages may be stored in a structure such as a database, may be stored as a list of strings, etc.

The request interface 706 provides access to messages in the datastore 704 to modules/components that want to know what messages have been posted. For example, in response to a request from a module/component, the request interface 706 may transmit messages that have been newly posted since the last request from the module/component. In other example, the request interface 706 may receive a request that specifies a query (e.g., a request for messages identified with a particular module identifier) and may retrieve the matching messages and transmit them to the requesting module/component. In another example, the request interface 706 may receive an event request that specifies that a module/component is to be notified whenever a particular event occurs (e.g., any time a message is posted from a particular module identifier). Any combination of the foregoing or other methods for retrieving messages may be utilized.

While an example manner of implementing the message interface 302 of FIG. 3 is illustrated in FIG. 7, one or more of the elements, processes and/or devices illustrated in FIG. 7 may be combined, divided, re-arranged, omitted, eliminated and/or implemented in any other way. Further, the example message receiver 702, the example datastore 704, the example request interface 706 and/or, more generally, the example message interface 320 of FIG. 3 may be implemented by hardware, software, firmware and/or any combination of hardware, software and/or firmware. Thus, for example, any of the example message receiver 702, the example datastore 704, the example request interface 706 and/or, more generally, the example message interface 320 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example message receiver 702, the example datastore 704, the example request interface 706 and/or, more generally, the example message interface 320 are hereby expressly defined to include a tangible computer readable storage device or storage disc such as a memory, DVD, CD, Blu-ray, etc. storing the software and/or firmware. Further still, the example message receiver 320 of FIG. 7 may include one or more elements, processes and/or devices in addition to, or instead of, those illustrated in FIG. 7, and/or may include more than one of any or all of the illustrated elements, processes and devices.

Figure 8:
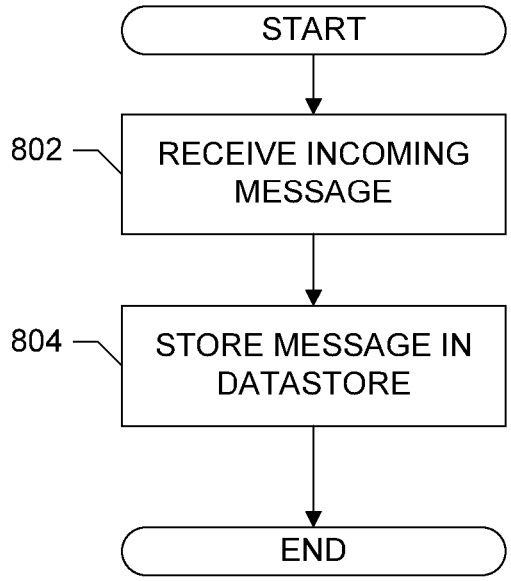
FIGS. 8-10 are flowcharts representative of example machine readable instructions that may be executed to implement the message interface of FIG. 7.
Figure 9:
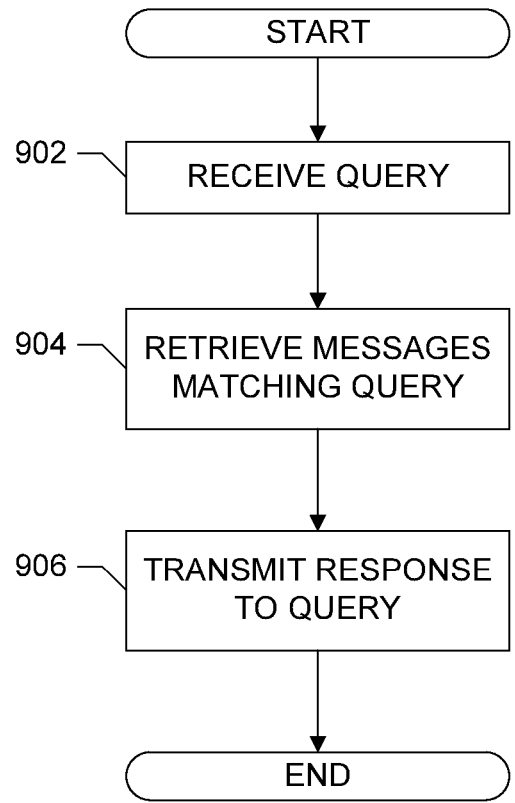
Figure 10:
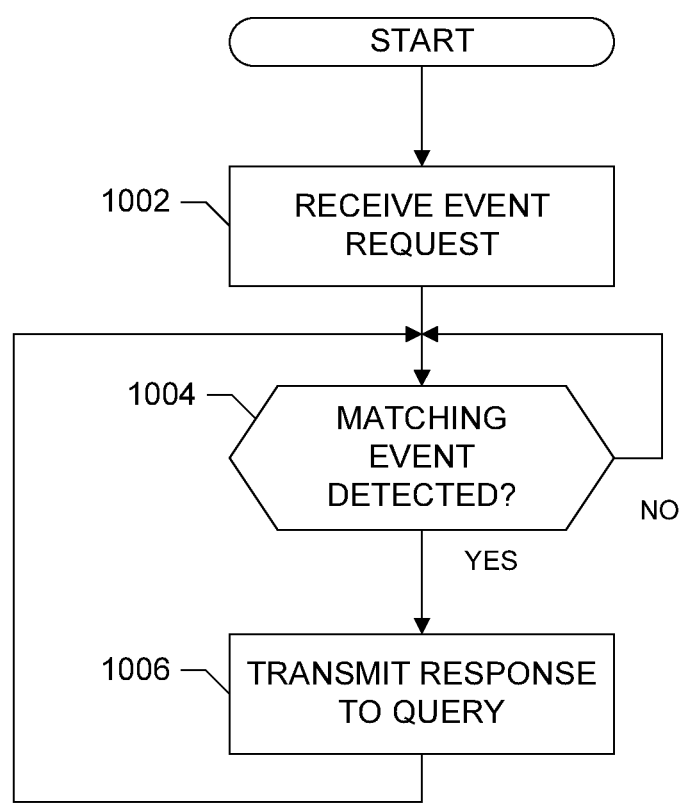

A flowchart representative of example machine readable instructions for implementing the message interface 320 of FIGS. 3 and/or 7 is shown in FIGS. 8-10. In these examples, the machine readable instructions comprise one or more programs for execution by a processor such as the processor 712 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 8-10, many other methods of implementing the example message interface 320 of FIGS. 3 and/or 7 may alternatively be used. For example, the order of execution of the blocks may be changed, and/or some of the blocks described may be changed, eliminated, or combined.

As mentioned above, the example processes of FIGS. 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The program of FIG. 8 begins when the message receiver 702 of the example message interface 320 receives a message from a module or component (block 802). The message interface 320 stores the message in the datastore 704 (block 804).

The program of FIG. 9 begins when the request receiver 706 of the example message interface 320 receives a query from a module or component (block 902). For example the query may request messages identified with a particular module identifier. The request receiver 706 retrieves the matching message(s) from the datastore 704 (block 904). The request receiver 706 then transmits the matching message(s) to the module or component that sent the initial request (block 906).

The program of FIG. 10 begins when the request receiver 706 of the example message interface 320 receives an event request from a module or component (block 1002). For example, the event request may request that the request receiver 706 notify the module or component whenever a message matching particular criteria is posted to the message interface 320. The request receiver 706 then determines if a message matching the event has been detected (block 1004). For example, the message receiver 706 may determine if a matching event has been detected by receiving a notification of a new message from the message receiver 702 and checking the message against criteria specified in the event request. Additionally or alternatively, the request receiver 706 may poll the datastore 704 for messages matching criteria specified in the event request. When the request receiver 706 does not identify a message matching the event request, the request receiver 706 continues monitoring for a matching event. When the request receiver 706 identifies a matching event, the request receiver 706 transmits the messages associated with the event to the module/component that sent the initial request. According to the illustrated example, control returns to block 1004 to continue monitoring for more events. Alternatively, the program of FIG. 10 could end after an event has been found (e.g., if a module/component wanted another notification, it could send another request).

Figure 11:
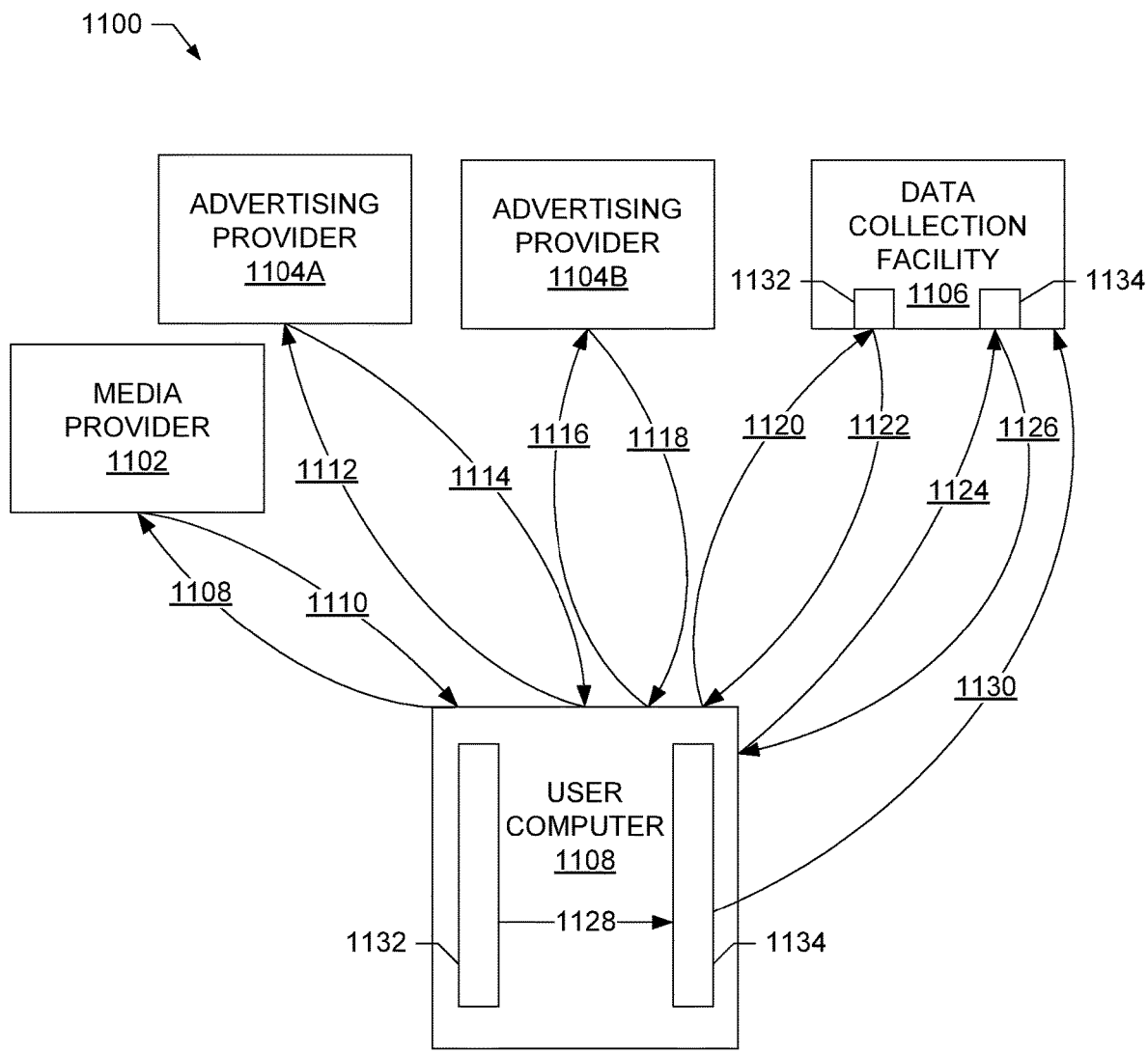
FIG. 11 is a block diagram of an example system constructed in accordance with the teachings of this disclosure for presenting and tracking media.

FIG. 11 is a block diagram of an example system 1100 for presenting and tracking media. The example system 1100 includes a media provider 1102, two advertising providers 1104A and 1104B, a data collection facility 1106, and a user computer 1108. The system 1100 of the illustrated example is an internet-based system in which the user computer 1108 is communicatively coupled by one or more networks to the media provider 1102, the advertising providers 1104A and 1104B, and the data collection facility 1106. The one or more networks (or other networks) may also communicatively couple any of the media provider 1102, the advertising providers 1104A and 1104B and the data collection facility 1106. The system 1100 may alternatively not be an internet-based system and may be implemented in any other environment.

The media provider 1102 is similar to the media provider 102 of FIG. 1, the advertising providers 1104A and 1104 are similar to the advertising provider 104 of FIG. 1, the data collection facility 1106 is similar to the data collection facility 1105 of FIG. 1, and the user computer 1108 is similar to the user computer 106 of FIG. 1. Accordingly, the description of these components is not repeated to reduce redundancy.

The block diagram of FIG. 1 includes an example message flow illustrated by messages 1108-1130. The example message flow begins when the user computer 1108 sends a request (e.g., a hyper-text transport protocol (HTTP) GET request) to the media provider 1102 (message 1108). In response to the message 1108, the media provider 1102 transmits a webpage (or any other media) to the user computer 1108 (message 1110). The webpage includes references to two advertisements. The references to the advertisements cause the user computer 1106 to send requests to the advertising provider 1104A (message 1112) and the advertising provider 1104B (message 1116). In response to the messages 1112 and 1116, the advertising provider 1104A and the advertising provider 1104B send the requested advertisements to the user computer 1108 in message 1114 and message 1118, respectively. The advertisements are instrumented with instructions that cause the user computer 1108 to request, from the data collection facility 1106, module 1132 for the advertisement from advertising provider 1104A and module 1134 for advertising provider 1104B via message 1120 and message 1124, respectively.

In response to the message 1120 and 1124, the data collection facility 1106 transmits the requested modules 1132, 1134 to the user computer 1108 via message 1122 and message 1126, respectively. According to the illustrated example, the module 1132 meters presentation of the advertisement from the advertising provider 1104A and the module 1134 meters presentation of the advertisement from the advertising provider 1104B. Additionally or alternatively, one of the modules or another module could also meter presentation of the content of the webpage, audience interaction with the webpage, or any other operation.

The user computer 1108 executes the modules 1132 and 1134. Using the methods and apparatus disclosed herein, the modules 1132 and 1134 are made aware of each other's presence and coordinate execution. In particular, the module 1134 is selected to transmit metering data to the data collection facility on behalf of both modules 1132 and 1134. Accordingly, module 1132 provides gathered metering data in message 1128 to module 1134 utilizing the communication methods and apparatus disclosed herein. The module 1134 transmits the metering data from module 1132 and metering data from module 1134 in message 1130 to the data collection facility.

By coordinating the communication of data from modules to a data collection facility, the number of separate messages sent to the data collection facility can be reduced, which reduces the load on the servers of the data collection facility that receive such messages. Furthermore, advantages may be realized in associating data from separate modules by utilizing a shared connection to the data collection facility. For example, when a webpage includes multiple advertisements, each including modules metering those advertisements, and, possibly, a module to meter the content of the webpage, by coordinating the modules communicating, as disclosed herein, and transmitting communications that associate metering data from the various modules (e.g., by transmitting the metering data in a single message, by the transmitting module labeling the metering data as coming from a single source, etc.), the presentation of the advertisements and the content can be linked. In other words, the data collection facility can more easily determine that the advertisements and the content were presented together even though the content and advertisements may have all come from different sources.

Figure 12:
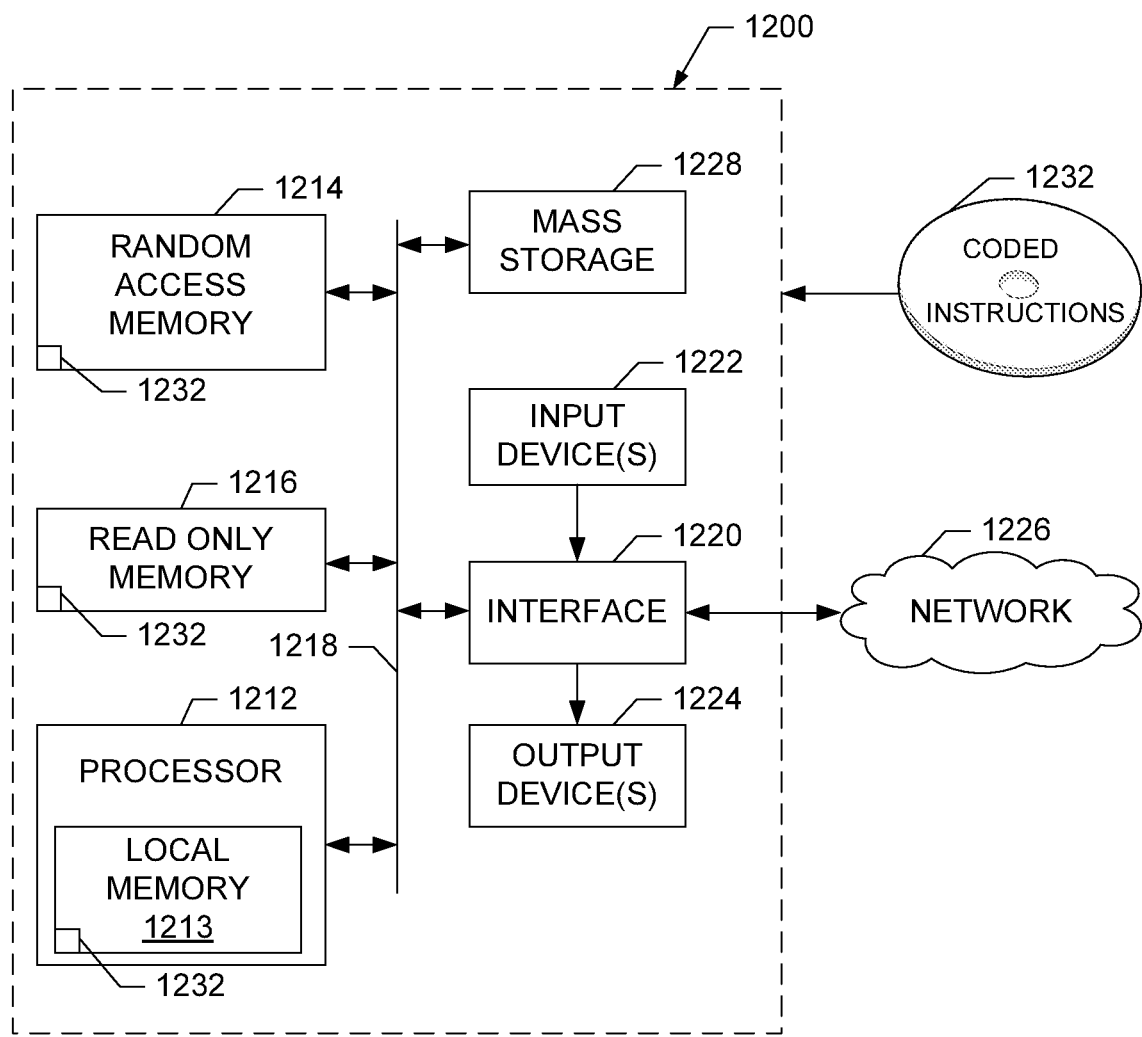
FIG. 12 is a block diagram of an example processing system that may execute the example machine readable instructions of FIG. 4 to implement the example module(s) of FIGS. 2 and/or 3.

FIG. 12 is a block diagram of an example processor platform 1200 capable of executing the instructions of FIGS. 4, 8, 9, and/or 10 to implement the module 206 of FIG. 2. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIG. 12, which may be the machine readable instructions of FIGS. 4, 8, 9, and/or 10, may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture facilitate communication between modules. Some examples as disclosed herein enable modules to coordinate execution to prevent the loading of multiple instances of components utilized. By sharing access to an instance of a component, fewer processing cycles are expending by not loading additional instances of a component, less memory is required for the execution of multiple modules that would otherwise load multiple instances of components, module execution is thereby faster, the possibility of interfering communication among modules and multiple instance components is reduced, and so forth.

When the methods and apparatus disclosed herein are utilized to facilitate coordination of modules that perform metering, audience measurement, presentation monitoring, and so forth advantages may be realized. For example, when multiple modules that each meter media from multiple media sources (e.g., content, advertisements, etc.) communicate as disclosed herein the presentation of the media can be linked. For example, when a webpage causes multiple advertisements to be loaded from different advertisement providers (e.g., on different domains) modules that meter the multiple advertisements can communicate such that metering data from the modules can be linked to a presentation of the webpage (e.g., the metering data from all of the modules can be associated with a unique identifier, the metering data can be sent in a single message, etc.). Additionally or alternatively, sending metering data from multiple modules in a message can reduce the load on the servers of a data collection facility that would other need to handle multiple messages sent nearly simultaneously from a user computer presenting media.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   a processor to execute instructions to:
   load an advertisement within a webpage with the processor;
   load a first module within the webpage, the first module including the advertisement;
   generate a first module identifier by executing the first module;
   send, with the first module executing on the processor, a query to a datastore associated with an application message interface to determine an availability of a toolbox by reviewing messages stored by the datastore, the toolbox to enable monitoring of advertisements; and in response to the query returning an indication the toolbox is not available:
load the toolbox by executing the first module on the processor, the first module to monitor presentation of the advertisement with the toolbox; and
send a first message to the datastore indicating the first module has loaded the toolbox, the first message including the first module identifier.

2. The apparatus of claim 1, wherein the processor further executes the instructions to:
in response to the query returning an indication the toolbox, the toolbox loaded by a second module identified by a second module identifier, the second module loaded prior to the first module and to monitor presentation of a second advertisement with the toolbox, is available:
retrieve, from the datastore associated with the application message interface, with the first module executing on the processor, the second module identifier; and
utilize the toolbox with the first module, the first module to monitor presentation of the advertisement with the toolbox, the first module communicating with the toolbox through messages posted at the datastore associated with the application message interface utilizing the first and second module identifiers.

3. The apparatus of claim 2, wherein the first module identifier and the second module identifier are random or pseudorandom numbers.

4. The apparatus of claim 2, wherein the query determines the availability of the toolbox by checking the application message interface for a second message posted to the application message interface by the second module, the second module including the second module identifier.

5. The apparatus of claim 1, wherein the application message interface includes a postMessage application programming interface.

6. The apparatus of claim 1, wherein the toolbox includes a script to monitor the advertisement.

7. The apparatus of claim 1, wherein the first module is in an environment which prevents direct cross domain communication between modules.

8. A method comprising:
loading an advertisement within a webpage with a processor, the advertisement including instructions;
loading a first module within the webpage by executing the instructions on the processor;
generating a first module identifier by executing a first module;
sending, with the first module executing on the processor, a query to a datastore associated with an application message interface to determine an availability of a toolbox by reviewing messages stored by the datastore, the toolbox to enable monitoring of advertisements; and
in response to the query returning an indication the toolbox is not available:
loading the toolbox by executing the first module on the processor, the first module to monitor presentation of the advertisement with the toolbox; and
sending a first message to the datastore indicating the first module has loaded the toolbox, the first message including the first module identifier.

9. The method of claim 8, further including:
in response to the query returning an indication the toolbox, the toolbox loaded by a second module identified by a second module identifier, the second module loaded prior to the first module and to monitor presentation of a second advertisement with the toolbox, is available:
retrieving, from the datastore associated with the application message interface, with the first module executing on the processor, the second module identifier; and
utilizing the toolbox with the first module, the first module to monitor presentation of the advertisement with the toolbox, the first module communicating with the toolbox through messages posted at the datastore associated with the application message interface utilizing the first and second module identifiers.

10. The method of claim 9, wherein the first module identifier and the second module identifier are random or pseudorandom numbers.

11. The method of claim 9, wherein the query determines the availability of the toolbox by checking the application message interface for a second message posted to the application message interface by the second module, the second module including the second module identifier.

12. The method of claim 8, wherein the application message interface includes a postMessage application programming interface.

13. The method of claim 8, wherein the toolbox includes a script to monitor the advertisement.

14. The method of claim 8, wherein the first module is in an environment which prevents direct cross domain communication between modules.

15. A non-transitory computer readable medium comprising instructions which, when executed, cause at least one processor to at least:
load an advertisement within a webpage;
load a first module within the webpage, the first module associated with the advertisement;
generate a first module identifier by executing the first module;
send a query to a datastore associated with an application message interface to determine an availability of a toolbox by reviewing messages stored by the datastore, the toolbox to enable monitoring of advertisements; and
in response to the query returning an indication the toolbox is not available:
load the toolbox by executing the first module on the processor, the first module to monitor presentation of the advertisement with the toolbox; and
send a first message to the datastore indicating the first module has loaded the toolbox, the first message including the first module identifier.

16. The non-transitory computer readable medium of claim 15, wherein the instructions further cause the at least processor to:
in response to the query returning an indication the toolbox, the toolbox loaded by a second module identified by a second module identifier, the second module loaded prior to the first module and to monitor presentation of a second advertisement with the toolbox, is available:

retrieve, from the datastore associated with the application message interface, with the first module executing on the processor, the second module identifier; and utilize the toolbox with the first module, the first module to monitor presentation of the advertisement with the toolbox, the first module communicating with the toolbox through messages posted at the datastore associated with the application message interface utilizing the first and second module identifiers.

17. The non-transitory computer readable medium of claim 16, wherein the first module identifier and the second module identifier are random or pseudorandom numbers.

18. The non-transitory computer readable medium of claim 16, wherein the query determines the availability of the toolbox by checking the application message interface for a second message posted to the application message interface by the second module, the second module including the second module identifier.

19. The non-transitory computer readable medium of claim 15, wherein the application message interface includes a postMessage application programming interface.

20. The non-transitory computer readable medium of claim 15, wherein the first module is in an environment which prevents direct cross domain communication between modules.

* * * * *